C. Borden. Jr,
Vacuum Pan.
No. 15,553.  Patented Aug. 19, 1856.
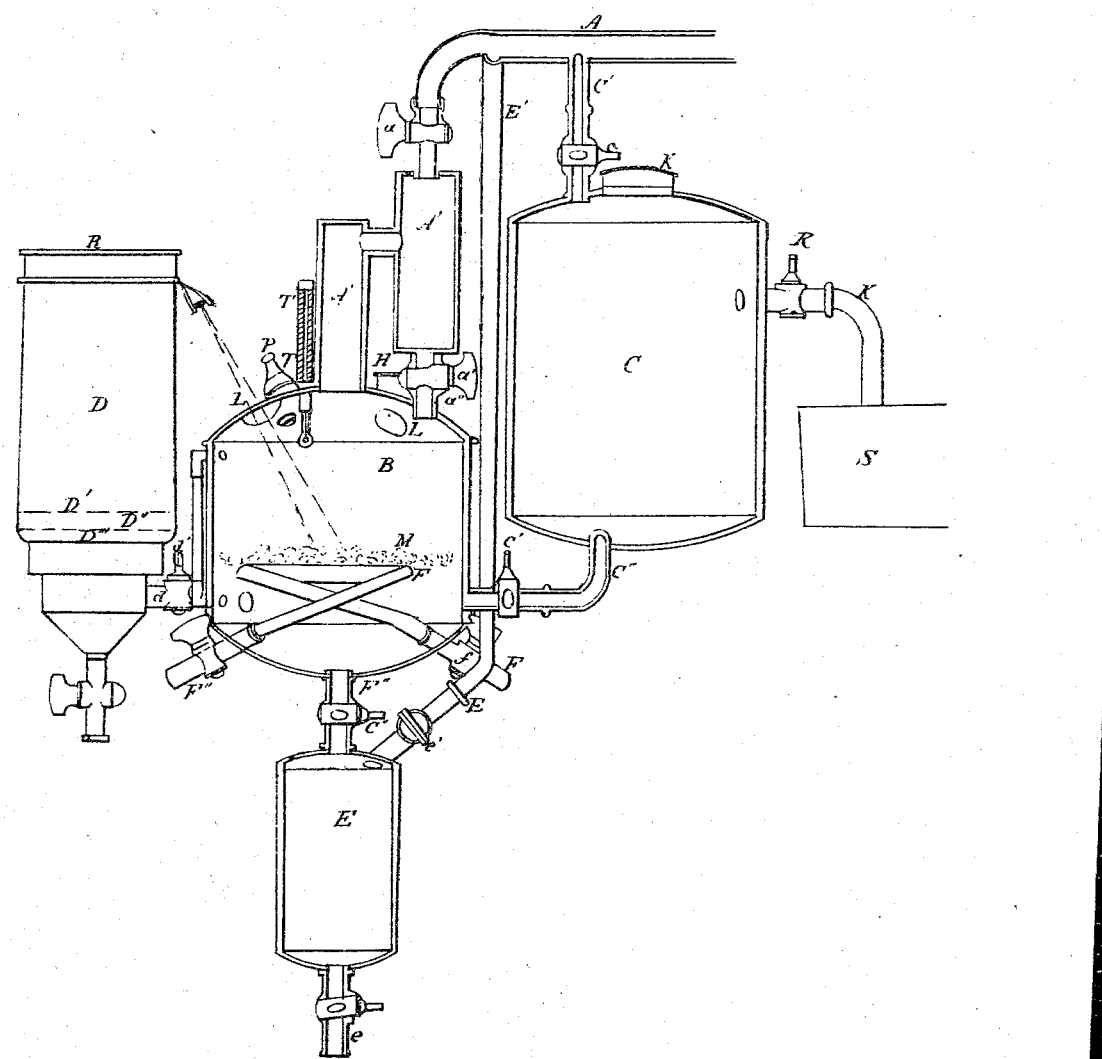

UNITED STATES PATENT OFFICE.

GAIL BORDEN, JR., OF BROOKLYN, NEW YORK.

IMPROVEMENT IN CONCENTRATION OF MILK.

Specification forming part of Letters Patent No. 15,553, dated August 19, 1856.

*To all whom it may concern:*

Be it known that I, GAIL BORDEN, Jr., of the city of Brooklyn, in the county of Kings, State of New York, have discovered and invented a new and useful Process and Improvement for the Concentration and Preservation of Milk; and I do hereby declare that the following is a full, clear, and exact description of the same, reference being had to the annexed drawing, said drawing being a vertical view of the apparatus and forming a part of this specification, except the vessel marked D, which does not pertain to this application.

To enable others skilled in the art to make and use my invention, I herein describe its nature, office, and construction.

First. The nature of my discovery and invention consists in concentrating milk in a vacuum-vessel out of contact with the atmosphere, to prevent incipient decomposition, or any hurtful change in the constituent elements of the milk during the process of evaporation.

Second. It also consists in keeping the new sweet milk to be concentrated, *in vacuo*, in a vessel from which the air is exhausted, to keep the milk out of contact with the atmosphere.

B is a vacuum boiler or pan for concentrating the milk out of contact with the atmosphere.

A is a pipe connected with the vacuum-boiler, and to an air-pump and condenser.

C is a vacuum-reservoir, in which new sweet milk is placed and kept in vacuum until it is required to be transferred or let into the vacuum-boiler B for concentration. This reservoir is connected with the boiler and with the air-pump.

The milk is boiled and concentrated in the vacuum-vessel B by means of steam applied in the known way, and the application of the air-pump and condenser. When a steam-pipe is employed inside of the boiler, it should be so coiled that every part of it may be reached by the hand with a scrub-brush to clean it. Both steam-pipe and jacket may be employed at the same time. A thermometer is inserted into the boiler, and a vacuum-gage connected with it to indicate the temperature of the boiling fluid and the extent of the vacuum.

The milk which I desire to concentrate is placed in the vacuum-reservoir C as soon as practicable after the milking, where it remains until let into the boiler for concentration. The milk may be scalded in this reservoir, or it should be done previous to its being put into it. By scalding the milk at a temperature of from 150° to 200° Fahrenheit, previous to its concentration, portions of its albumen coagulate and adhere to the surface of the vessel, and thus prevent its coating the vacuum-boiler. The vacuum is produced in the reservoir C by the air-pump, through a pipe connected therewith, as A and C'.

c is a cock to open and close the communication.

C" is a pipe communicating with the reservoir and boiler.

c' is a cock to open and close the communication.

The reservoir is provided with a man-hole for convenience of cleaning. It is charged with milk through a pipe leading to the cans by means of atmospheric pressure.

The boiling or working of the vacuum-boiler is conducted in a similar manner to vacuum-pans in the manufacture of refined sugar in the common way, except that I find it best first to place a small quantity of milk in the boiler. I then (after the boiling has commenced) let the milk flow into the boiler from the reservoir by a stream gradually running in through pipe C", regulated in quantity by the cock c' in such a manner as always or during the principal part of the evaporating process to keep and maintain the fluid in the boiler B at about the same consistence or state of spissitude.

The arrangement and position of the vessels employed may be made to conform with buildings in which they are placed.

To facilitate the operation of concentrating milk, so as to keep the vacuum-boiler constantly employed, I provide a vacuum receiving-vessel below and in connection with the boiler, as E, in which I can at pleasure produce a vacuum by a connecting-pipe leading to the air-pump, a cock being provided to let on and shut off the vacuum, as E' and e". When the milk is sufficiently concentrated in the boiler B, it can be let into the receiving-vessel E by means of cock $e''$ without breaking the vacuum in the former.

Milk may be concentrated to any degree required. I do not confine myself to one standard. I have reduced it eighty-three per cent., but commonly sixty-five to eighty per cent.

For long keeping I place the concentrated milk in hermetically-sealed vessels. For keeping a few days or weeks, according to the temperature of the weather, it is unnecessary thus to seal them.

The concentrated milk, having been cooled, is poured into the canisters or vessels, which are filled quite full, covered tightly, turned upside down, and deposited in a cool place.

I am aware that a vacuum-pan has long been used for the concentration of saccharine sirups and refining sugar, to prevent discoloration by a high degree of heat, and also employed in producing extracts to avoid scorching or burning. I concentrate milk in vacuum for a different purpose.

I have discovered that the water in milk can be expelled without changing the qualities of its other constituents if evaporated out of contact with the air by preventing the action of the oxygen on the milk while in the process of concentration, thereby preventing incipient decomposition or any hurtful change.

Like blood, milk is a living fluid, and as soon as drawn from the cow begins to die, change, and decompose. In no other process for concentrating milk with which I am acquainted has any adequate means been adopted to prevent incipient decomposition of the milk and render it preservative and soluble.

My milk is prepared for use by adding water in proportion to the degree of concentration to which it had been subjected, and when in this state will produce an equal quantity of cream with the original milk. It is rendered preservative and soluble without the use of sugar or any antiseptic, which has not, to my knowledge, ever been effected before.

Besides the advantages of concentrating milk in vacuum, there is no means yet discovered by which evaporation is so rapidly and safely conducted.

Milk concentrated by my plan can be afforded for less than half the price at which other concentrated milk has usually been sold.

My process will cause milk to become in as general and common use as sugar.

Having thus explained my invention, I would state that I am well aware that sugar and various extracts have been and are now concentrated in a vacuum under a low degree of heat to prevent discoloration and burning. I do not claim boiling milk and concentrating it in a vacuum-vessel for such a purpose.

I am also aware that scalding milk to improve its preservative qualities has long been known, and that it has been kept in hermetically-sealed vessels. I do not claim these processes.

I am also aware that Wm. Newton and many others since have obtained patents for concentrating milk by various modes of evaporation, and combining it with sugar to render it soluble and preservative. I do not claim this as my discovery or invention; but

What I claim, and desire to secure by Letters Patent, is—

Producing concentrated sweet milk by evaporation *in vacuo*, substantially as set forth, the same having no sugar or other foreign matter mixed with it.

Brooklyn, June 12, 1856.

GAIL BORDEN, Jr.

Witnesses:
   CHARLES McNEIL,
   WALTER S. LEWIS.